United States Patent [19]

Kodama et al.

[11] Patent Number: 4,639,352
[45] Date of Patent: Jan. 27, 1987

[54] HARD ALLOY CONTAINING MOLYBDENUM

[75] Inventors: Mitsuo Kodama; Masaya Miyake; Minol Nakano; Tsuyoshi Asai; Akio Hara, all of Itami, Japan

[73] Assignee: Sumitomo Electric Industries, Ltd., Osaka, Japan

[21] Appl. No.: 808,228

[22] Filed: Dec. 13, 1985

Related U.S. Application Data

[63] Continuation of Ser. No. 738,908, May 29, 1985, abandoned, which is a continuation of Ser. No. 548,034, Nov. 2, 1983, abandoned, which is a continuation of Ser. No. 269,664, Jun. 2, 1981, abandoned.

[51] Int. Cl.$^4$ .............................................. C22C 29/02
[52] U.S. Cl. .................................. 419/15; 75/233; 75/237; 75/238; 75/236; 75/240; 75/241; 75/242; 419/13; 419/16; 419/31; 419/53; 419/54
[58] Field of Search .................. 75/236–238, 75/240–244, 232–234; 419/13–16, 31, 53, 54

[56] References Cited

U.S. PATENT DOCUMENTS

| | | | |
|---|---|---|---|
| 4,049,380 | 9/1977 | Yih | 75/203 |
| 4,049,876 | 9/1977 | Yamamoto | 75/241 |
| 4,066,451 | 1/1978 | Rudy | 75/203 |
| 4,212,671 | 7/1980 | Ettmayer | 75/238 |
| 4,216,009 | 8/1980 | Miyake et al. | 75/0.5 AB |
| 4,265,662 | 5/1981 | Miyake et al. | 75/238 |

FOREIGN PATENT DOCUMENTS

| | | |
|---|---|---|
| 79-89 | 2/1979 | PCT Int'l Appl. |
| 635221 | 4/1950 | United Kingdom |
| 2011949 | 7/1979 | United Kingdom |
| 2015572 | 9/1979 | United Kingdom |
| 1593326 | 7/1981 | United Kingdom |

Primary Examiner—Stephen J. Lechert, Jr.
Assistant Examiner—Anne Brooks
Attorney, Agent, or Firm—Wenderoth, Lind & Ponack

[57] ABSTRACT

This invention relates to a hard alloy comprising two phases: a hard phase consisting of at least one compound having a crystal structure of simple hexagonal MC type (M: metal; C: carbon) selected from the group consisting of mixed carbides, carbonitrides and carboxynitrides of molybdenum and tungsten, and a binder phase consisting of at least one element selected from the group consisting of iron, cobalt and nickel. The hard phase is prepared by carburizing an (Mo, W) alloy obtained by reducing oxides of molybdenum and tungsten with a particle size of at most 1 micron, is composed of coarse particles with a mean particle size of at least 3 microns, and has a uniform molybdenum to tungsten ratio in the particles. The hard alloy has a gross composition within the range of the shaded portion ABCDEA in FIG. 1.

12 Claims, 5 Drawing Figures

HARD ALLOY CONTAINING MOLYBDENUM

This application is a continuation of now abandoned application Ser. No. 738,908, filed May 29, 1985, which is a continuation of now abandoned application Ser. No. 548,034, filed Nov. 2, 1983, which is a continuation of now abandoned application Ser. No. 269,664, filed June 2, 1981.

BACKGROUND OF THE INVENTION

1. Field of the Invention

This invention relates to a hard alloy containing molybdenum and more particularly, it is concerned with a composition of a hard alloy comprising a hard phase consisting of at least one compound having a crystal structure of simple hexagonal MC type (M: metal, C: carbon) and a binder phase, which alloy is suitable for use in making tools capable of resisting high impact for a long time.

2. Description of the Prior Art

The first report on a (Mo, W)C base alloy is British Pat. No. 635,221. This describes a process for producing the (Mo, W)C base alloy by nitriding oxides of molybdenum and tungsten in an ammonia stream, carburizing the nitrides with release of nitrogen, adding an auxiliary metal in powder form to serve as a binder in the sintered alloy, and sintering. This alloy was new at that time as an alloy consisting of one or two carbides of (W, Mo)C and (W, Mo)$_2$C with a binder metal, but has not been put to practical use.

Molybdenum monocarbide (MoC) is considered a useful substitute, since this carbide has the same crystal structure, a simple hexagonal type, as tungsten carbide as well as mechanical properties similar to tungsten carbide. However, the existence of the hexagonal molybdenum monocarbide as a simple substance has remained questionable, and thus an attempt to stabilize molybdenum has exclusively been carried out by forming a solid solution with tungsten carbide. This method was firstly reported by W. Dawihl in 1950, but this solid solution was not examined in detail and its commercial worth was not apparent in those days.

Of late, however, the study to utilize the solid solution $(Mo_xW_y)C$ where $x+y=1$ has become active with the rise of the price of tungsten. It is very interesting why a study on this solid solution and an attempt to use the same has not been carried out so actively up to the present time.

In the prior art process for the production of a solid solution of MoC-WC, WC, Mo and C powders or W, Mo, C and Co powders are mixed, charged in a carbon vessel and reacted at a temperature of 1660° to 2000° C. (W. Dawhil: "Zeitschrift f. Anorganische Chemie" 262 (1950) 212). In this case, cobalt serves to aid in forming the carbide and to dissolve molybdenum and carbon in the tungsten carbide. In the absence of cobalt, it is very difficult to obtain a solid solution of (Mo, W)C. When a (Mo, W)C powder obtained by this method is used for the production of a cemented carbide alloy with a binder metal of cobalt as a substitute for WC, however, (Mo, W)C decomposes in the alloy to deposit needle crystals of (Mo, W)$_2$C. Deposition of even a small amount of such a subcarbide with aggregation in the alloy causes deterioration of the strength of the alloy. For this reason, the use of MoC as a substitute for WC has not been attempted with positive results.

In a process for the production of mixed carbides, in general, carbides are heated in the presence of each other, optionally using a diffusion aid such as cobalt, to give a uniform solid solution in most cases, but in the case of a composition of solid solution containing at least 70% of MoC, a uniform solid solution cannot be obtained by counter diffusion only at a high temperature. This is due to the fact that MoC is unstable at a high temperature and is decomposed into solid solutions such as (Mo, W)C$_{1-x}$ and (Mo, W)$_3$C$_2$ and, consequently, a solid solution (Mo, W)C of WC type cannot be formed only by cooling it. As a method of stabilizing this carbide, it has been proposed to react the components once at a high temperature, to effect diffusion of Mo$_2$C and WC, and to hold the product at a low temperature for a long time (Japanese Patent Application (OPI) No. 146306/1976). However, a considerably long diffusion time and long recrystallization time are required for forming (Mo, W)C from (Mo, W)C$_{1-x}$ and (Mo, W)$_3$C$_2$ at a low temperature. For the practice of this method on a commercial scale, the mixture should be heated for a long time in a furnace to obtain a complete carbide. This means that the productivity per furnace is lowered and a number of furnaces are thus required. When using a continuous furnace, on the other hand, a long furnace is necessary and mass production is difficult on an industrial scale.

Under these circumstances, the inventors have made various efforts to provide a solid solution (Mo-W) in an economical manner based on the thought that if an alloy consisting of a solid solution (Mo-W) can be prepared at a low cost and a (Mo-W)C powder as a hard material can readily be produced on a commercial scale, the use of these materials or their cemented carbide alloys will remarkably be increased. Consequently, the inventors have reached an invention as disclosed in U.S. Pat. No. 4,216,009 which consists in a process for the production of an alloy powder containing molybdenum and tungsten and having a crystal structure of simple hexagonal WC type, comprising mixing molybdenum and tungsten in the form of compounds thereof selected from the group consisting of oxides, hydroxides, chlorides, sulfates, nitrates, metallic acids, salts of metallic acids and mixtures thereof, the resulting mixture of the compounds having a particle size of at most 1 micron, reducing the mixture with at least one member selected from the group consisting of hydrogen and ammonia to form an alloy powder of molybdenum and tungsten, and then carburizing the alloy powder.

Furthermore, the inventors have proposed cemented carbide alloys as disclosed in Japanese Patent Application (OPI) Nos. 145,146/1980 and 148,742/1980, which are suitable for impact resisting tools. The former invention provides an impact resisting cemented carbide alloy containing molybdenum, characterised in that the friction coefficient is less than 70% of that between WC-Co type alloys and steels, but this alloy does not have a sufficient life, in particular, when subjected to repeated impacts, because it contains a hard phase of the MC type. The latter invention provides an impact resisting cemented carbide alloy comprising a hard phase of mixed carbides of molybdenum and tungsten of the MC type and a binder phase of cobalt and nickel, represented by $(Mo_xW_{1-x})C_z$-$(Ni_yCo_{1-y})$ where $0.5 \leq x \leq 0.95$, $0.5 \leq y \leq 1.0$ and $0.90 \leq z \leq 0.98$, but this alloy does not have a long life under such severe condition as encountered when subjected to high impacts for a long time.

SUMMARY OF THE INVENTION

It is an object of the present invention to provide a hard alloy containing molybdenum and tungsten.

It is another object of the present invention to provide a hard alloy corresponding to a cemented carbide alloy consisting of a hard phase of tungsten carbide (WC) a part of which is replaced by molybdenum carbide (MoC), and a binder phase of an iron group metal.

It is a further object of the present invention to provide a hard alloy having a hard phase consisting of a carbide, carbonitride or carboxynitride of molybdenum and tungsten with simple hexagonal crystal structure of MC type, and a binder phase consisting of a least one of iron, cobalt and nickel, in which the hard phase has a relatively large mean particle size and a uniform distribution of molybdenum and tungsten.

It is a still further object of the present invention to provide a hard alloy capable of resisting high impact for a long time.

It is a still further object of the present invention to provide a tool suitable for use where a high resistance to cyclic loads is required.

The objects can be attained by a hard alloy comprising two phases, (1) a hard phase consisting at least one compound having a crystal structure of simple hexagonal MC type (M: metal; C: carbon) selected from the group consisting of mixed carbides, carbonitrides and carboxynitrides of molybdenum and tungsten, (2) and a binder phase consisting of at least one element selected from the group consisting of iron, cobalt and nickel, in which the hard phase (a) is one prepared by carburizing an (Mo, W) alloy obtained by reducing oxides of molybdenum and tungsten with a particle size of 1 micron or less, (b) is composed of coarse particles with a mean particle size of 3 microns or more and (c) has a uniform molybdenum to tungsten ratio in the particles, and which hard alloy has a gross composition within the shaded portion ABCDEA in FIG. 1.

BRIEF DESCRIPTION OF THE DRAWINGS

The accompanying drawings illustrate the principle and merits of the present invention in more detail.

DETAILED DESCRIPTION OF THE INVENTION

In accordance with the present invention, there is provided a hard alloy comprising two phases, i.e. a hard phase consisting of at least one compound having a crystal structure of simple hexagonal MC type (M: metal; C: carbon) selected from the group consisting of mixed carbides, carbonitrides and carboxynitrides of molybdenum and tungsten, and a binder phase consisting of at least one element selected from the group consisting of iron, cobalt and nickel. The hard phase is prepared by carburizing an (Mo, W) alloy obtained by reducing oxides of molybdenum and tungsten with a particle size of 1 micron or less. Also, the hard phase is composed of coarse particles with a mean particle size of 3 microns or more, and has a uniform molybdenum to tungsten ratio in the particles. The hard alloy has a gross composition within the shaded portion ABCDEA in FIG. 1.

The inventors have hitherto made various efforts to improve (Mo, W)C-iron group metal alloys and consequently, have found that uniform dispersion of granular or globular (Mo, W)$_2$C (which will hereinafter be referred to as $M_2$C) therein is effective for increasing the yield stress and breaking strength (U.S. Pat. No. 4,265,662), but this alloy is not suitable for use where a high fatigue strength is required upon exposure to a high impact for a long time. This is possibly due to the fact that the dispersed (Mo, W)$_2$C rather acts as a harmful element for this purpose. Where a high fatigue strength is required upon exposure to a high impact for a long time, "crack propagation" is regarded as important rather than "crack initiation" and in particular, "crack propagation" tends to extend along the boundaries between the hard phase and binder metal with high probability. Thus, it is necessary to reduce the boundaries of the hard phase and binder metal and this can be achieved by increasing the particle size of the hard phase and the thickness of the binder phase.

The inventors have carried out a heading test of bolts by utility tools made of materials as shown in Table 1 by changing the particle size of the hard phase in a considerably binder metal-rich region, thus obtaining results as shown in Table 2:

TABLE 1

|  | Particle Size of Carbide (μ) | Compressive Strength (Kg/mm$^2$) | TRS* (Kg/mm$^2$) | VHN** |
|---|---|---|---|---|
| (Mo, W)C-25 wt % Co (A) | 5 | 327 | 270 | 760 |
| (Mo, W)C-25 wt % Co (B) | 1 | 345 | 295 | 810 |
| WC-22 wt % Co (C) | 5 | 310 | 280 | 830 |

Note:
*Transverse Rupture Strength
**Vickers Hardness Number

TABLE 2

| | Die Life (Number of Samples Processed/Die) × 10$^5$ | | | | | |
|---|---|---|---|---|---|---|
| | 0 | 2 | 4 | 6 | 8 | 10 |
| Alloy (A) | | | | | | ———x |
| Alloy (B) | | | | | ———x | |
| Alloy (C) | | ———x | | | | |

Note:
Mark x means a broken point.
Test Conditions:
workpiece: S45C Steel
forging speed: 100 samples per minute As is evident from these results, the strength of an alloy and the die life are not always consistent with each other. An alloy of low hardness and low strength alloy, with a coarse grain size, exhibits the longest life. That is, the tool can be used even after cracks or deformations occur. This suggests that the life of a tool does not depend on the initiation of cracks but depends on the propagation speed of cracks leading to the overall breakage thereof.

Therefore, the inventors have concentrated on preparation of a coarse grain carbide and consequently, have found that it is more difficult to obtain an (Mo, W)C with a large particle size than WC since molybdenum has an effect of retarding particle growth. However, it was further found that when using particularly, the solid solution (Mo-W) prepared by the process of U.S. Pat. No. 4,216,009 as mentioned above, a carbide with a particle size of 3 microns or more can readily be obtained by controlling the carburizing conditions, for example, by adjusting the carburization temperature to a temperature which is sufficiently high but lower than the decomposition point of (Mo, W)C into (Mo, W)$_2$C, for example, to 1450° C. in the case of (Mo$_{0.7}$W$_{0.3}$)C. For the preparation of a carbide with a larger particle size, e.g. 6 microns or more, the carburization is preferably carried out after the solid solution (Mo-W) is subjected to a heat treatment. The heat treatment is generally carried out at a temperature of 1100° to 1400° C. for 1 to 5 hours in a stream of nitrogen or hydrogen. In the case of (Mo$_{0.5}$W$_{0.5}$)C, for example, the solid solution is thermally treated at 1300° C. for 3 hours in a stream of nitrogen.

When WC, Mo$_2$C and C are used as starting materials and subjected to carburization according to the prior art, on the other hand, it is very difficult to form a coarse carbide with a particle size of 3 microns or more, and even if coarse starting materials are used, there is only formed a carbide having a fluctuating Mo/W ratio in each particle, because the carbon in the carbide acts as a diffusion barrier. The use of such a carbide with a binder metal results in a nonuniform alloy of low mechanical strength.

In view of the above described facts, it will clearly be understood that an alloy containing a coarse carbide with a particle size of at least 3 microns, in particular, at least 5 microns, and having a desired mechanical property, i.e. impact resistance, must be prepared by way of the process comprising reacting the solid solution of (Mo, W) with carbon, which is capable of forming a uniform and large particle size (Mo, W)C. Otherwise, preparation of such an alloy is impossible.

As a result of studies by the inventors on the sintering phenomenon of an alloy consisting of two phases of (Mo, W)C and a binder metal, it was found that in (Mo, W)C base alloys, there does not take place growth of carbide particles due to Ostwald ripening of the dissolving and precipitating type which can be seen in the ordinary WC base alloys, but there is a very slow particle growth of diffusion rate-controlling type. In the (Mo, W)C base alloys, the particle growth during sintering, which can be seen in the prior art WC base alloys, is scarcely expected and therefore, a carbide to be used as a raw material must be of coarse particles so as to prepare an alloy containing a hard phase with a large particle size.

Similarly, the inventors have conducted various experiments and measured typical properties in order to make clear the features of M$_2$C precipitated alloys and M$_2$C non-precipitated alloys.

Figure 2:
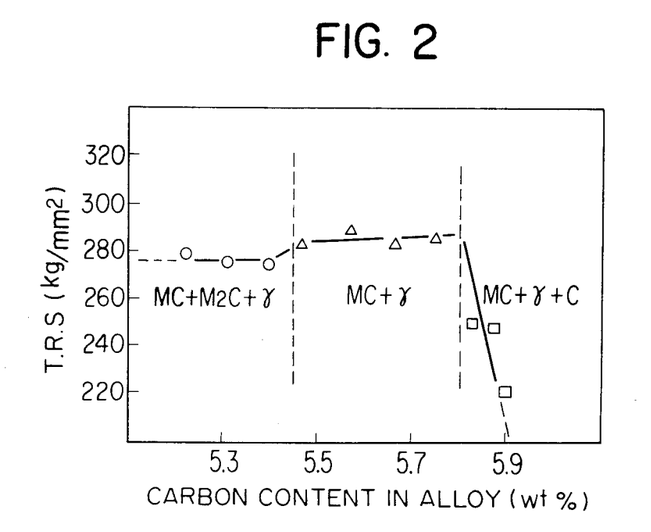
FIG. 2 is a graphical representation of the relationship between the carbon content in alloy and the change of the transverse rupture strength (TRS) in an $(Mo_{0.7}W_{0.3})C$-35 wt % Co alloy.

FIG. 2 is a graphical representation of the relationship between the carbon content (% by weight) and transverse rupture strength (Kg/mm$^2$) in an (Mo$_{0.7}$W$_{0.3}$)C-35 weight % Co alloy. As is apparent therefrom, the transverse rupture strength lowers rapidly with precipitation of free carbon, but does not so lower even if M$_2$C is precipitated. This is considered to be due to the fact that the M$_2$C phase is dispersed uniformly and finely so that dispersion strengthening appears, but it is hardly related with the lowering of the transverse rupture strength.

Figure 3:
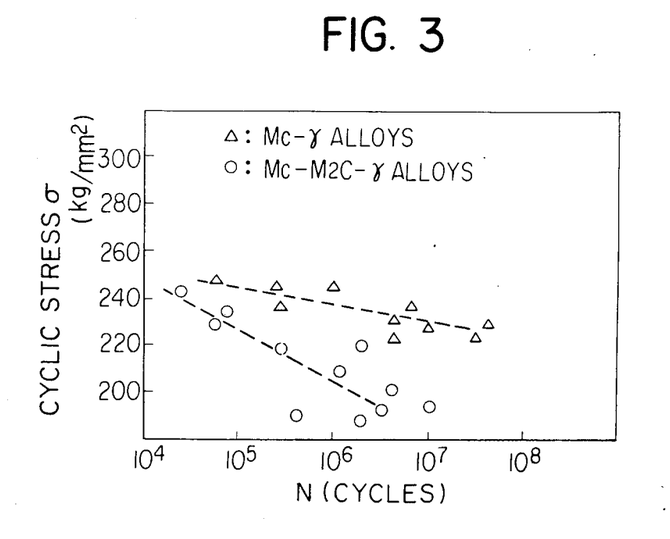
FIG. 3 is a graph showing the results of a fatigue test of an $(Mo_{0.7}W_{0.3})C$-35 wt % Co alloy (Δ: MC-γ alloys; O: MC-$M_2$C-γ alloys) in which a cyclic load σ is applied.

FIG. 3 is a graph showing the results of a fatigue test of an (Mo$_{0.7}$W$_{0.3}$)C-35 weight % Co alloy, in which a static load at a certain level is applied to a sample cyclically. It is apparent from these results that the M$_2$C-precipitated alloy (MC-M$_2$C-$\gamma$ alloys represented by mark O) is inferior to the M$_2$C-nonprecipitated alloy (MC-$\gamma$ alloys represented by mark $\Delta$) in fatigue strength. This is possibly due to the fact that the finely dispersed M$_2$C phase increases the boundaries between the hard phase and binder metal phase and acts to promote crack propagation, since cracks propagate predominantly along the boundaries between the hard phase and binder phase. In the case of wear resisting tools, in general, a high stress is intermittently applied for a long time and in addition, some factors of promoting crack propagation, such as thermal impact and corrosion embrittlement are involved, so a high fatigue strength is required. In such a case, M$_2$C should not be precipitated.

M$_2$C tends to aggregate and grow larger abnormally with an increase of the quantity thereof, which acts as a stress concentrating source causing lower fatigue toughness when high impact energy is applied.

As the same time, it is also proved by a field test that the quantity of M$_2$C precipitated should be held to a minimum or reduced to substantially zero for the purpose of displaying sufficiently the performance of a tool in a case where an alloy having a relatively large binder phase, and a structure such that the mean free path of the binder phase is large, is used.

The inventors have made further studies on a hard alloy consisting of (Mo, W)C and an iron group metal by changing the ratio of Mo and W and the amount of the iron group metal over a wide range and it was thus found that the two phase region {(MC+$\gamma$) zone} is about $\frac{1}{3}$ of that of WC base alloys in the case of (Mo$_{0.7}$W$_{0.3}$)C base alloys, and about 1/5 of that of WC base alloys in the case of (Mo$_{0.9}$W$_{0.1}$)C base alloys. When the binder metal is changed from cobalt to iron in order, some shift takes place in the two phase region, but there is little change in width. These data are collected and arranged to give results as shown in FIG. 1 wherein the boundary line of M$_2$C-precipitated zone and M$_2$C-nonprecipitated zone is drawn by line a.

Figure 1:
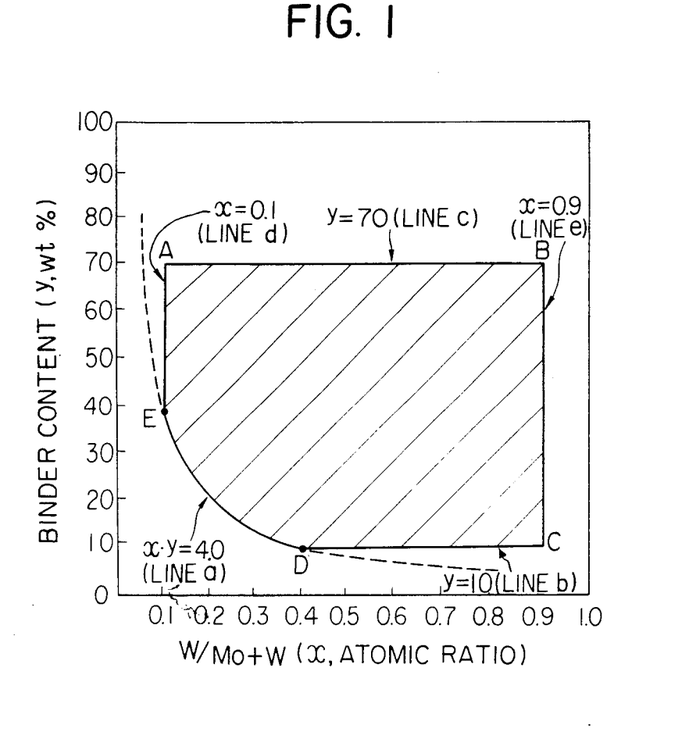
FIG. 1 is a graphical representation of the composition of a hard alloy according to the present invention in showing the relationship between W/(Mo+W) atomic ratio and binder content.

Furthermore, the inventors have conducted a number of exeriments by changing the ratio of Mo and W and the quantity of iron group metals over a wide range, and have thus found that when, industrially, the maximum amount of free carbon is 0.07% by weight, a (MC+$\gamma$) zone containing at least 0.07% by weight of carbon can be represented by the relationship of $$\frac{q}{p+q} \times r \geq 4.0,$$

i.e. above line a in FIG. 1, where the alloy composition consists of (Mo$_p$W$_q$)C−r weight % binder metal. In other words, it has been quantitatively determined that M$_2$C tends to be precipitated with an increase of the ratio of Mo in the ordinary (Mo, W)C base alloys, and the amount of binder metal should be increased so as to suppress precipitation of M₂C. For example, as can be seen from FIG. 1, the two phase region of (MC+γ), free from precipitation of M₂C, and containing free carbon in an amount of to at most 0.07% by weight, requires more than 13.5% by weight of binder metal in the case of (Mo$_{0.7}$W$_{0.3}$)C base alloys, and at least 20% by weight of binder metal in the case of (Mo$_{0.8}$W$_{0.2}$)C base alloys. As a matter of course, line a is shifted upward when the (MC+γ) zone exceeds 0.07% by weight as free carbon content, wherein the two phase region of (MC+γ) is stable.

Referring to FIG. 1, the reason for limiting the W/(Mo+W) ratio to 0.1≦W/(Mo+W)≦0.9 is that if the ratio is less than 0.1, the carbide is so unstable that it tends to be decomposed into M₂C, while if more than 0.9, there is little effect of molybdenum as (Mo, W)C. The reason for limiting the amount of binder metal to 10 to 70% by weight is that if less than 10% by weight is used, the alloy itself becomes so brittle that it cannot be used, while if more than 70% by weight, the sintering is so difficult that a desired shape cannot be maintained.

The iron group metal as a binder phase can naturally dissolve Group IVa, Va and VIa metals and it is possible to add even other elements having solubility therein such as aluminum, silicon, calcium, silver, etc. while still achieving the merits of the present invention.

The basic concept of the present invention can be maintained even when a part of molybdenum and tungsten carbide is replaced by a B1 type mixed carbide containing titanium, zirconium, hafnium, vanadium, niobium, tantalum, chromium, molybdenum and/or tungsten in a proportion of 30% by weight or less, preferably 0.5 to 25% by weight.

This also applies even in the case of an alloy wherein a part of C in the carbide is replaced by nitrogen and/or oxygen. Examples of the preferred embodiment in this case are as follows.

The first embodiment is incorporation of N in (W, Mo)C to give (W, MO)(C, N) whereby a stable starting material of hexagonal WC type can be obtained without a lengthy heat treatment.

The second embodiment is incorporation of O in (S, Mo)(C, N) to give (W, MO)(C, N, O) which is more stable.

The third embodiment is incorporation of Cr in (W, Mo)(C, N) or (W, Mo)(C, N, O) to give (W, Mo, Cr)(C, N) or (W, Mo, Cr)(C, N, O) whereby a starting material with a low weight and low price can be obtained.

The fourth embodiment is that in the production of these starting material powders, a mixture of oxides, metals, carbides and/or carbon is exposed to an atmosphere having a nitrogen partial pressure of 300 Torr or more at a temperature of 700° C. or higher in a part of the carburization step to form a stable starting powder.

The fifth embodiment is that, when the above described starting powder is combined with an iron group metal, two or more kinds of hard phases of simple hexagonal WC type differing in composition are caused to be present in the finished alloy, thereby imparting a high toughness thereto.

In these five embodiments, a part of the MC type phase can also be replaced by a B1 type solid solution containing one or more of Group IVa, Va and VIa metals and non-metallic elements, or the ordinary additives to cemented carbides, such as silver, silicon, bismuth, copper, aluminum, etc. can also be added to the iron group binder metal while still maintaining the merits of the present invention.

The above described embodiments will now be illustrated in greater detail.

In the important system of the present invention wherein there is a simple hexagonal phase containing molybdenum and tungsten, it was found in the sintered alloy with a binder metal that, when $$A = \left(\frac{\text{N atom \%}}{(\text{Mo} + \text{W}) \text{ atom \%}}\right) \times \left(1 - \frac{\text{W atom \%}}{(\text{Mo} + \text{W}) \text{ atom \%}}\right),$$

the suitable range of A is 0.005≦A≦0.5. If A is less than the lower limit, the effect of nitrogen does not appear, while if more than the upper limit, sintering to give excellent properties is difficult. The most suitable range of A is 0.01≦A≦0.4.

Concerning the effect of oxygen, it was found that, when $$B = \left(\frac{\text{O atom \%}}{(\text{Mo} + \text{W}) \text{ atom \%}}\right) \times \left(1 - \frac{\text{W atom \%}}{(\text{Mo} + \text{W}) \text{ atom \%}}\right),$$

the suitable range of B is 0.005≦B≦0.05. If B is less than the lower limit, there is no favourable effect of oxygen, while if more than the upper limit, sintering is difficult to give excellent properties. The most suitable range of B is 0.01≦B≦0.04.

On the other hand, the W/Mo ratio is preferably 10/90 to 90/10, since if less than 10/90, the alloy is unstable, while if more than 90/10, the merits of the replacement (light weight, low price) are substantially lost. The quantity of chromium used for replacing molybdenum or tungsten is 0.5 or less by atomic ratio of (W+Mo), since if more than 0.5, the alloy is brittle although the corrosion resistance is increased.

As well known in the art, it is advantageous for cutting tools to form a B1 type solid solution composed of at least one of Group IVa, Va and VIa metals such as titanium, zirconium, hafnium, vanadium, tantalum, chromium, molybdenum and tungsten with at least one of non-metallic components such as carbon, nitrogen and oxygen, in addition to the simple hexagonal phase. The quantity of the B1 type solid solution is preferably changed depending upon the cutting use.

Concerning the quantity of nitrogen in this case, it was found as a result of the inventors' various experiments that, when the definition of A is changed to $$\left(\frac{\text{N atom \%}}{\text{Group IVa, Va, VIa metals atom \%}}\right) \times$$

$$\left(1 - \frac{\text{W atom \%}}{\text{Group IVa, Va, VIa metals atom \%}}\right),$$

the suitable range of A is also 0.005≦A≦0.5 although a part of the nitrogen is occluded in the B1 type solid solution. The optimum range of A is 0.01≦A≦0.4. Concerning the quantity of oxygen, it was found as a result of the inventors various experiments that, when the definition of B is changed to $$\left(\frac{\text{O atom \%}}{\text{Group IVa, Va, VIa metals atom \%}}\right) \times$$

$$\left(1 - \frac{\text{W atom \%}}{\text{Group IVa, Va, VIa metals atom \%}}\right),$$

the suitable range of B is also $0.005 \leq B \leq 0.05$. The optimum range of B is $0.01 \leq B \leq 0.04$.

As the binder metal, there is preferably used an iron group metal in a proportion of 10 to 70% by weight based on the entire weight of the composition, since if less than 10% by weight, the alloy is brittle and if more than 70% by weight, the alloy is too soft.

For the preparation of starting materials, the reaction is carried out at a high temperature in a hydrogen atmosphere in the case of carburization of a (Mo, W) powder with carbon, reduction and carburization of oxide powders with carbon or combination thereof. At this time, it is found as a result of our studies on the decomposition nitrogen pressure of (Mo, W)(C, N) that the external nitrogen pressure, depending on the temperature, should be 300 Torr or more at 700° C. or higher at which the carbonitrization reaction takes place. The coexistence of hydrogen is not always harmful, but it is desirable to adjust the quantity of hydrogen to at most two times that of nitrogen, in particular, at most the same as that of nitrogen so as not to hinder the nitriding reaction. In the case of using an ammonia decomposition gas, it is necessary to enrich it with nitrogen.

For the preparation of starting materials containing oxygen, the coexistence of carbon monoxide and carbon dioxide is required in the atmosphere. In this case, the quantity of hydrogen is not limited as described above, but should not exceed 50% of the atmosphere. Heating and sintering in an atmosphere of nitrogen or carbon oxide is effective for the purpose of preventing the sintered alloy from denitrification or deoxidation.

The inventors have further made studies to develop an alloy having a higher wear resistance and toughness and consequently, have found that the deformation at a high temperature can remarkably be improved by changing tungsten carbide to a carbide composed of a solid solution of three elements, molybdenum, tungsten and chromium. That is, a (Mo, W)C-Co alloy has a higher hardness at a high temperature than a WC-Co alloy and, when Cr is further dissolved in this carbide, the hardness is further raised and the high temperature hardness is also improved. Thus, the disadvantages of the prior art WC-Co alloy can be overcome by one effort. It is to be noted that the carbide phase consists of a solid solution of (Mo, W, Cr)C. It is also found that when Cr is dissolved in a solid solution of (Mo, W)C, the carbide particles can be made finer and stabilized as a monocarbide of (Mo, W, Cr)C. On the contrary, the known method of adding merely chromium to the binder phase has the disadvantages that it is impossible to make the carbide finer and the carbide phase is not stabilized as a monocarbide of a solid solution of (Mo, W, Cr). The quantity of chromium to be added to the solid solution carbide (Mo, W)C ranges preferably from 0.3 to 10%, since if less than 0.3%, the carbide cannot be made finer, while if more than 10%, $Cr_3C_2$ is separated and precipitated in the alloy, resulting in lowering of the hardness.

In a further embodiment of the present invention, a part of the carbon in the solid solution carbide (Mo, W, Cr)C is replaced by nitrogen, oxygen and/or hydrogen. That is, it is assumed that if the carbon contained in (Mo, W, Cr)C is added as solid and reacted with a reactivity of 100%, the crystal is stabilized, but now it is found that incorporation of not only carbon but also nitrogen results in stabilization of the monocarbide as (Mo, W, Cr)(CN) and further incorporation of oxygen and hydrogen further stabilizes the monocarbide as (Mo, W, Cr)($C_a N_b O_c H_d$)(a+b+c+d=1), because if there are defects in the carbide, the carbide is unstable during sintering and an $M_2C$ type mixed carbide precipitates as needles to thus lower the strength.

In a still further embodiment of the present invention, one or more of manganese, rhenium, copper, silver, zinc and gold are incorporated in the binder phase to change the microstructure of the binder phase and to make it non-magnetic. At the same time, it was found that, when these elements are added, the binder phase is alloyed, whereby the corrosion resistance of the alloy is improved.

In the last embodiment of the present invention, the toughness of the alloy can be raised by using, in combination, two or more carbides having a simple hexagonal phase but differing in the ratio of Mo/W. The detailed reason of increasing the toughness is not clear, but it is assumed that when (Mo, W)C is separated into two phases, the solution strain of both the phases is lowered to give a higher toughness than in the case of a single phase. Since at least an alloy consisting of a $(Mo_x W_y)C$ (y>x) phase having a similar property to that of WC, and a $(Mo_x W_y)C$ (x>y) phase having a similar property to that of MoC, has two properties, i.e. toughness of WC and heat and deformation resistance of MoC, this embodiment is more advantageous than when using one kind of (Mo, W)C only. Most preferably, the carbide is composed of WC or a solid solution of some MoC dissolved in WC and a solid solution of WC dissolved in MoC. This corresponds to a case where the peak of plane (1, 0, 3) is separated in two in X-ray diffraction. Whether there are two or more simple hexagonal phases of $Mo_x W_y)C$ or not can be confirmed by observation using an optical microscope after etching with an alkaline solution of a hexacyanoferrate (III) or by XMA observation.

The application or use range of the alloy of the present invention is as follows. For example, the alloy of the present invention can be used for wear resisting tools such as guide rollers, hot wire milling rollers, etc., and for cutting tools, because it has a toughness and hardness similar to or better than WC-Co alloys. In particular, when the alloy of the invention as a substrate is coated with one or more wear resisting ceramic layers such as, for example, of TiC, TiN, $Al_2O_3$, cutting tools more excellent in toughness as well as wear resistance can be obtained than the prior art tools having WC-Co type alloys as a substrate. As well known in the art, at this time, a decarburization layer called $\eta$-phase is formed at the boundary between the substrate and coating layer and this appears similarly in the alloy of the present invention. In order to prevent the embrittlement directly under the coating layer due to decarburization, the presence of free carbon (FC) in the surface layer within a range of 300 microns is effective without deteriorating the toughness.

When using the alloy of the present invention as a watch frame, it shows more excellent properties than WC-Co type alloys, which are summarized below:

(1) Beautiful brightness can be given when the alloy is specularly finished.

(2) Grinding and polishing workings are possible.

(3) Corrosion resistance is excellent, in particular, against perspiration in the case of wearing jewelry.

(4) Mechanical strength is considerably high.

The present invention will be further illustrated in greater detail in the following examples. It will be self-evident to those skilled in the art that the ratios, ingredients in the following formulation and the order of operations can be modified within the scope of the present invention. Therefore, the present invention is not to be interpreted as being limited to the following examples. All parts, percents and the like are to be taken as those by weight unless otherwise indicated.

EXAMPLE 1

54 g of Mo powder and 46 g of W powder were dissolved in 28% aqueous ammonia, neutralized with 6N hydrochloric acid to coprecipitate and then subjected three times to filtration with water washing and drying. In the resulting precipitate, $WO_3$ and $MoO_3$ were finely mixed. The mixed oxides were fired at 800° C. in the air and then reduced at 1000° C. in a hydrogen stream. X-ray diffraction showed that the resulting powder was a complete solid solution of $(Mo_{0.7}W_{0.3})$.

The resulting solid solution $(Mo_{0.7}W_{0.3})$, carbon powder and Co powder as a diffusion aid were mixed in such a proportion that the final composition would be $(Mo_{0.7}W_{0.3})C_{1.0}$ and subjected to carburization reaction at 1450° C. for 1 hour in a nitrogen stream under a nitrogen pressure of 1 atm. It was found by X-ray diffraction that the carbide had a crystal structure of simple hexagonal WC type and measurement of the particle size using Fisher Sub Sieve Sizer showed a mean particle size of 4.5 microns.

This powder was mixed with Co powder in such a proportion that the final composition would be $(Mo_{0.7}W_{0.3})C$-30% Co, ball milled with alcohol medium, pressed in a desired shape and then sintered in a vacuum of $10^{-2}$ Torr. The thus obtained alloy had a structure consisting of two phases of MC phase and binder metal phase, and a hardness of 880 by Vickers hardness and a bending strength of 290 Kg/mm².

EXAMPLE 2

Figure 4:
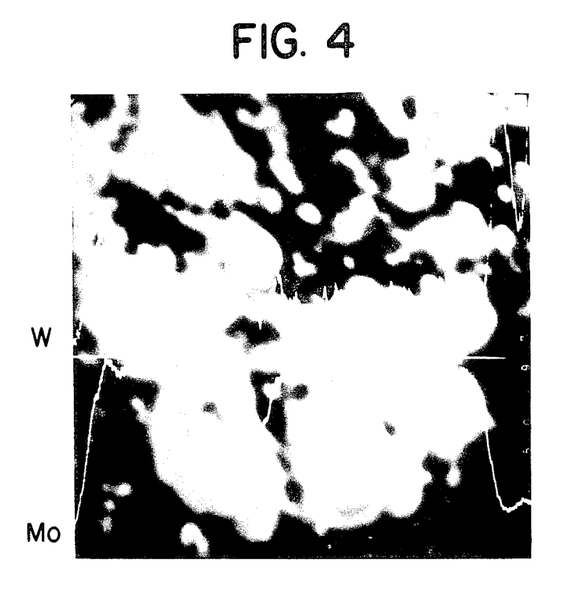
FIG. 4 is a micrograph, magnified 5,000 times, of $(Mo_{0.5}W_{0.5})C$ according to the present invention, in which Mo and W are uniformly distributed.

A solid solution of $(Mo_{0.5}W_{0.5})$ was prepared in an analogous manner to Example 1 except changing the Mo/W atomic ratio to 0.5:0.5. This solid solution was mixed with carbon powder and Co powder as a diffusion aid in such a proportion that the final composition would be $(Mo_{0.5}W_{0.5})C_{1.0}$ and subjected to carburization reaction at 1500° C. for 1 hour in a nitrogen stream under a nitrogen pressure of 1 atm. It was found by X-ray diffraction that the resulting carbide powder had a crystal structure of simple hexagonal WC type and by measurement of the particle size thereof using Fisher Sub Sieve Sizer that it had a mean particle size of 5.2 microns (Cf. FIG. 4).

This powder was mixed with Ni powder and Co powder in such a proportion that the final composition would be $(Mo_{0.5}W_{0.5})C$-15% Ni-15% Co, ball milled with alcohol medium, pressed in a desired shape and then sintered in a vacuum of $10^{-2}$ Torr. The thus obtained alloy had 5.49% of total carbon and 0.01% of free carbon as analytical values, a structure consisting of two phases of MC and binder metals, and a hardness of 900 by Vickers hardness and a bending strength of 300 Kg/mm².

Figure 5:
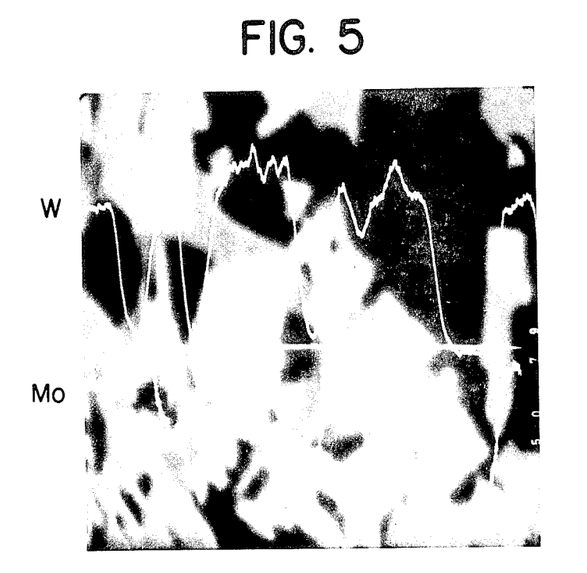
FIG. 5 is a micrograph, magnified 5,000 times, of $(Mo_{0.5}W_{0.5})C$ according to the prior art, in which the Mo/W ratio is not uniform in each particle.

For comparison, WC powder with a particle size of 4 microns, $Mo_2C$ powder with a particle size of 3.5 microns, carbon powder and Co powder as a diffusion aid were mixed in such a proportion that the final composition would be $(Mo_{0.5}W_{0.5})C_{1.0}$, and sintered at 1700° C. in a vacuum of $10^{-2}$ Torr. The temperature was then lowered to 1350° C. and the mixture was held at this temperature for 12 hours. X-ray diffraction showed that the resulting carbide was substantially of (Mo, W)C having a crystal structure of simple hexagonal WC type, but there were partly peaks of $(Mo, W)_2C$ (Cf. FIG. 5).

This powder was mixed with Ni powder and Co powder in such a proportion that the final composition would be $(Mo_{0.5}W_{0.5})C$-15% Ni-15% Co and an alloy was prepared in the same manner as described above. The thus obtained alloy had 5.48% of total carbon and 0.02% of free carbon as analytical values, a structure consisting of MC phase, binder metal phase and $M_2C$ phase grown up through aggregation, and a hardness of 910 by Vickers hardness and a bending strength of 230 Kg/mm².

When using carbides as starting materials as in this comparative example, a uniform quality mixed carbide cannot always be obtained in the formation of the mixed carbide with a large particle size, and in an alloy obtained from this carbide, there is locally a carbon deficiency zone leading to formation of an aggregated $M_2C$ phase and resulting in lowering of the strength thereof.

Referring to FIG. 4 and FIG. 5, the heights of peaks of W and Mo show respectively the contents of W and Mo on the lines drawn in the micrographs of carbide crystals. It will be understood from comparison of FIG. 4 and FIG. 5 that in the case of FIG. 4 according to the present invention, the fluctuation of peaks of W and Mo on the line crossing the carbide crystal is smaller, i.e. the Mo/W ratio is more constant, that in the case of FIG. 5 according to the prior art.

EXAMPLE 3

Various alloys each having a composition within the range of the shaded area of FIG. 1 were prepared ans subjected to measurement of the hardness and transverse rupture strength, thus obtaining results shown in Table 3. The sintering temperature was varied from 1200° C. to 1450° C. for every composition:

TABLE 3

| Sample No. | Carbide Composition | Binder Metal | Hardness (Hv) | TRS (Kg/mm²) |
|---|---|---|---|---|
| Invention | | | | |
| 1 | $(Mo_{0.85}W_{0.15})C$ | 30Ni—5Co | 870 | 310 |
| 2 | $(Mo_{0.85}W_{0.15})C$ | 40Ni | 720 | 280 |
| 3 | $(Mo_{0.85}W_{0.15})C$ | 30Co—30Ni | 500 | — |
| 4 | $(Mo_{0.7}W_{0.3})C$ | 10Ni—10Co | 1150 | 260 |
| 5 | $(Mo_{0.70}W_{0.3})C$ | 15Ni—30Co | 600 | 250 |
| 6 | $(Mo_{0.7}W_{0.3})C$ | 50Ni—15Co | 445 | — |
| 7 | $(Mo_{0.55}W_{0.45})C$ | 15Ni | 1280 | 245 |
| 8 | $(Mo_{0.50}W_{0.50})C$ | 20Ni—5Co | 1020 | 265 |
| 9 | $(Mo_{0.30}W_{0.70})C$ | 35Co | 880 | 300 |
| 10 | $(Mo_{0.30}W_{0.70})C$ | 25Co—10Fe | 910 | 270 |
| 11 | $(Mo_{0.30}W_{0.70})C$ | 8Fe—12Ni | 1070 | 245 |
| 12 | $(Mo_{0.25}W_{0.75})C$ | 15Co—5Ni—8Fe | 900 | 230 |
| 13 | $(Mo_{0.20}W_{0.80})C$ | 15Ni—40Co | 600 | 240 |
| 14 | $(Mo_{0.20}W_{0.80})C$ | 30Fe | 950 | 245 |
| 15 | $(Mo_{0.20}W_{0.80})C$ | 10Ni—5Co | 1260 | 240 |
| 16 | $(Mo_{0.20}W_{0.80})C$ | 5Ni—5Co—2Fe | 1280 | 210 |
| Comparison | | | | |
| 17 | $(Mo_{0.80}W_{0.20})C$ | 5Ni—5Co | 1410 | 110 |

TABLE 3-continued

| Sample No. | Carbide Composition | Binder Metal | Hardness (Hv) | TRS (Kg/mm$^2$) |
|---|---|---|---|---|
| 18 | $(Mo_{0.70}W_{0.30})C$ | 2Ni—4Co | 1700 | 90 |
| 19 | $(Mo_{0.50}W_{0.50})C$ | 60Ni—15Fe | 420 | — |
| 20 | $(Mo_{0.05}W_{0.95})C$ | 3Ni | 1820 | 75 |

EXAMPLE 4

The solid solution $(Mo_{0.5}W_{0.5})$ prepared in Example 2 was mixed with carbon powder, $Cr_3C_2$ powder and Co powder as a diffusion aid in such a proportion that the final composition would be $(Mo_{0.45}W_{0.45}Cr_{0.10})C_{1.0}$, subjected to primary carburization at 1800° C. for 1 hour in a hydrogen stream and then to secondary carburization at 1500° C. for 1 hour in a hydrogen stream. It was found by X-ray diffraction that the resulting powder had a crystal structure of simple hexagonal WC type and by measurement of the particle size thereof that it had a mean particle size of 4.0 microns.

This carbide powder was mixed with Ni powder and Co powder in such a proportion that the final composition would be $(Mo_{0.45}W_{0.45}Cr_{0.10})C$-30% Ni-15% Co and then sintered at 1220° C. in a vacuum of $10^{-2}$ Torr. The thus obtained alloy had a structure consisting of two phases of MC and binder metals. When this alloy was polished with a diamond paste to give a mirror surface and immersed in an artificial sweat for 24 hours, there was hardly any corrosion thereof.

The alloy obtained in this example is suitable for use as a watch frame because of its light weight as well as excellent scratch proof property.

EXAMPLE 5

Heading dies were made of the Alloy Sample Nos. 1, 9, 12 and 14 of Example 3 and WC-25% Co alloy for comparison and the life of each was tested by subjecting them to cold forging of bolts of S45C steel, thus obtaining results shown in Table 4:

TABLE 4

| Tool Life (Number of Bolts Processed/Die) × $10^{-5}$ | | | | | |
|---|---|---|---|---|---|
| Alloy Sample No. | 0 | 2 | 4 | 6 | 8 |
| 1 | | | | —x | |
| 9 | | | | —x | |
| 12 | | | —x | | |
| 14 | | | —x | | |
| WC - 25% Co | —x | | | | |

EXAMPLE 6

910 g of the solid solution $(Mo_{0.7}W_{0.3})$ prepared in Example 1 was mixed with 90 g of carbon powder and 3 g of cobalt powder as a diffusion aid and then subjected to (1) carburization at 1450° C. for 1 hour in a nitrogen stream or (2) carburization at 1350° C. for 1 hour in a nitrogen stream. It was found by X-ray diffraction that both of the resulting carbides were uniformly composed of $(Mo_{0.7}W_{0.3})C$ and measurement of the particle size of these carbides by means of Fisher Sub Sieve Sizer showed that the carbide prepared by the process (1) had a mean particle size of 4.2 microns, while the carbide prepared by the process (2) had a mean particle size of 1.9 microns.

Each of these carbides was mixed with 30% of cobalt powder, ball milled with alcohol medium, pressed in a desired shape and then sintered.

Heading dies were made of the thus obtained alloys and the life of each was tested by subjecting them to cold forging of bolts of S45C steel, thus obtaining results shown in Table 5:

TABLE 5

| Tool Life (Number of Bolts Processed/Die) × $10^5$ | | | | | |
|---|---|---|---|---|---|
| Alloy Sample No. | 0 | 2 | 4 | 6 | 8 |
| Alloy from Process (1) | | | | —x | |
| | | | | —x | |
| Alloy from Process (2) | | —x | | | |
| | —x | | | | |

EXAMPLE 7

Piercing punches for punching a steel plate of 5 mm in thickness were made of the Alloy Sample Nos. 7 and 15 of Example 3 and a WC-12% Co alloy for comparison and used therefor 100,000 times. The amounts of wear of the piercing punches at that time are shown in Table 6:

TABLE 6

| Alloy Sample No. | Amount of wear (mm) |
|---|---|
| 7 | 0.07 |
| 15 | 0.08 |
| WC - 12% Co | 0.21 |

EXAMPLE 8

68.5% of an $(Mo_{0.7}W_{0.3})C$ powder with a particle size of 3 microns, 30% of Ni powder, 1% of Mn powder and 0.5% of Re powder were mixed while adjusting the quantity of carbon to 97% of the theoretical quantity, i.e. 6.10%, and the mixed powder was sintered at 1250° C. for 1 hour in a vacuum of $10^{-2}$ Torr. The resulting alloy was non-magnetic and had the following properties:

Density: 9.9 g/cm$^3$   Hardness (HRA): 84.5
Transverse Rupture Strength: 290 Kg/mm$^2$

EXAMPLE 9

75% of an $(Mo_{0.5}W_{0.5})C$ powder with a mean particle size of 4 microns, 10% of Ni powder, 13% of Co powder, 1% of Re powder, 0.8% of Mg powder and 0.2% of B powder were mixed while adjusting the quantity of carbon to 98% of the theoretical quantity of carbon, i.e. 5.93%, and the mixed powder was sintered at 1350° C. for 1 hour in a vacuum of $10^{-2}$ Torr. The resulting alloy had the following properties:

Density: 10.1 g/cm$^3$   Hardness (HRA): 86.5
Transverse Rupture Strength: 265 Kg/mm$^2$ For examination of the corrosion resistance, the above described alloy and a WC-20% Co alloy for comparison were subjected to tests using various corrosive solutions to give results as shown in Table 7:

TABLE 7

| | Amount of Corrosion (mg/cm$^2$/hr) | | |
|---|---|---|---|
| | I | II | III |
| Alloy of Invention | 2.5 | 0.2 | 0 |

TABLE 7-continued

| | Amount of Corrosion (mg/cm²/hr) | | |
|---|---|---|---|
| | I | II | III |
| WC - 20% Co | 2.8 | 2.1 | 0 |

Note:
I Hot 10% H$_2$SO$_4$ Solution
II 35% HCl Solution at Room Temperature
III 10% NaOH Solution at Room Temperature

EXAMPLE 10

30% of an (Mo$_{0.7}$W$_{0.3}$)C powder with a mean particle size of 5 microns, 35% of an (Mo$_{0.3}$W$_{0.7}$)C powder with a mean particle size of 0.5 micron, 25% of Ni powder and 10% of Co powder were mixed while adjusting the quantity of carbon to 97.5% of the theoretical quantity of carbon, i.e. 5.15%, and the mixed powder was sintered at 1320° C. for 1 hour in a vacuum of 10$^{-2}$ Torr. The resulting alloy had the following properties:

Density: 11.2 g/cm³    Hardness (HRA): 82.5
Transverse Rupture Strength: 280 Kg/mm²

Heading dies for a nut former were made of the above described alloy and a WC-25% Co alloy for comparison and the life of each was tested by cold forging nuts of S15C steel, thus obtaining results shown in Table 8:

TABLE 8

| Tool Life (Number of Nuts Processed/Die) × 10⁵ | | | | | | | |
|---|---|---|---|---|---|---|---|
| Alloy Sample No. | 0 | 2 | 4 | 6 | 8 | 10 | 12 |
| Alloy of Invention | ────────────── x (12.0) | | | | | | |
| WC - 25% Co | ──── x (4.2) | | | | | | |

What is claimed is:

1. A process for preparing a hard alloy having a gross composition within the range of the shaded portion ABCDEA in FIG. 1, comprising the following two phases:
    (1) a hard phase comprising at least one compound having a simple hexagonal MC type crystal structure selected from the group consisting of mixed carbides, carbonitrides and carboxynitrides of molybdenum and tungsten, and
    (2) a binder phase comprising at least one element selected from the group consisting of iron, cobalt, and nickel,
    which process comprises reducing a mixture of oxides of molydenum and tungsten having a particle size of at most 1 micron to produce an (Mo,W) alloy; heat treating said (Mo,W) alloy at a temperature of 1100° to 1400° C. in a stream of nitrogen or hydrogen; carburizing the heat-treated alloy at a controlled temperature which is as high as possible but lower than the decomposition temperature of (Mo,W)C into (Mo,W)$_2$C, to produce said hard phase composed of coarse particles having a mean particle size of at least 3 microns and having a uniform molybdenum to tungsten ratio in said coarse particles; mixing said hard phase with said binder phase; and sintering the resultant mixture to produce said hard alloy, said process being conducted in a manner to hold the quantity of M$_2$C precipitated to a minimum.

2. The process of claim 1, wherein a part of the compound of crystal structure is replaced by at least one hard B1 type compound selected from the group consisting of compounds containing Ti, Zr, Hf, V, Nb, Ta, Cr, Mo, and W.

3. The process of claim 2, wherein the quantity of the B1 type compound is at most 30% by weight.

4. The process of claim 1, wherein at least one of the mixed carbides is a solid solution of (Mo, W, Cr)C.

5. The process of claim 4, wherein the quantity of Cr is 0.3 to 10% by weight.

6. The process of claim 1, wherein a part of the carbon in the carbides forming the hard phases is replaced by at least one of nitrogen and oxygen.

7. The process of claim 6, wherein the quantities of nitrogen and oxygen are defined, in connection with the alloy composition, by the relationship of:

$$0.005 \leq \left(1 - \frac{\text{W atom \%}}{\text{Group IVa, Va, VIa metal atom \%}}\right) \times \left(\frac{\text{N atom \%}}{\text{Group IVa, Va, VIa metal atom \%}}\right) \leq 0.5,$$

and $$0.005 \leq \left(1 - \frac{\text{W atom \%}}{\text{Group IVa, Va, VIa metal atom \%}}\right) \times \left(\frac{\text{O atom \%}}{\text{Group IVa, Va, VIa metal atom \%}}\right) \leq 0.05.$$

8. The process of claim 1, wherein at least one element selected from the group consisting of Be, Mg, Ca, B, Si, P, Mn, Fe and Re is incorporated in the alloy.

9. The process of claim 1, wherein the hard phase comprises two or three simple hexagonal phases differing in the ratio of Mo/W.

10. The process of claim 1, wherein the mean particle size of the particles in the hard phase is at least 4 microns.

11. The process of claim 1, wherein the mean particle size of the particles in the hard phase is at least 5 microns.

12. The process of claim 1, wherein at least one element selected from the group consising of Mn, Re, Cu, Ag, Zn, and Au is incorporated in the binder phase to make the alloy non-magnetic.

* * * * *